Z. McDANIEL.
Hanging Millstones.
No. 30,025.                                Patented Sept. 11, 1860.
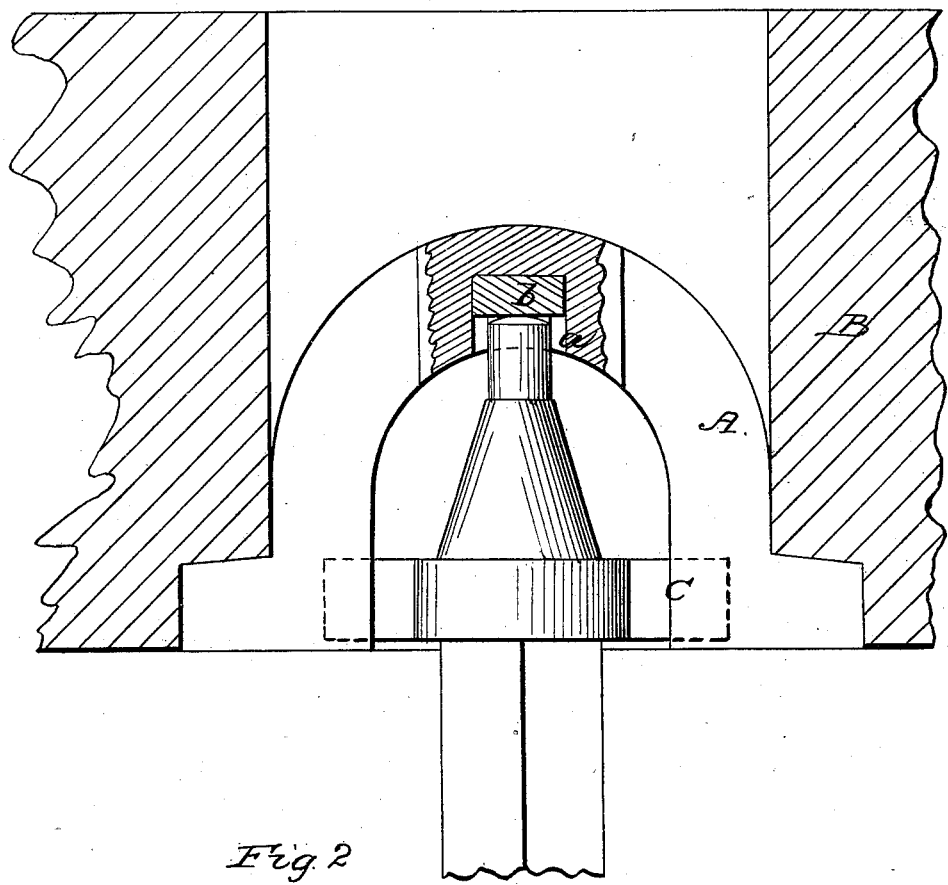

UNITED STATES PATENT OFFICE.

Z. McDANIEL, OF BOWLING GREEN, KENTUCKY, ASSIGNOR TO HIMSELF AND I. W. JEWELL, OF SAME PLACE.

HANGING MILLSTONES.

Specification of Letters Patent No. 30,025, dated September 11, 1860.

*To all whom it may concern:*

Be it known that I, Z. McDaniel, of Bowling Green, in the county of Warren and State of Kentucky, have invented a new and useful Improvement in Hanging Millstones; and I do hereby declare that the following is a full, clear, and exact description of the same, reference being had to the annexed drawings, making a part of this specification, in which—

Figure 1 is a side view of the balance iron of a mill stone showing my invention; Fig. 2 an inverted plan of the same.

Similar letters of reference indicate corresponding parts in the two figures.

The object of this invention is to allow the runner or revolving stone of a pair of mill stones to have a certain degree of independent lateral movement, so that it may adjust and balance itself perfectly on the spindle by virtue of its own rotation. To this end I employ a flat bearing plate placed in a suitable recess in the under side of the balance iron of sufficient dimensions to admit of the lateral adjusting movement of the runner; the bearing plate resting on the top of the spindle as hereinafter freely shown and described.

To enable those skilled in the art to fully understand and construct my invention I will proceed to describe it.

A, represents the balance iron of a mill stone. This balance iron may be of the usual form and fitted to the runner or revolving stone B, shown in blue outline in Fig. 1, in the ordinary way. In the under side of the balance iron at about its center there is made a circular recess $a$, in which a circular plate $b$, of steel or other suitable metal is placed. The under or face side of this plate $b$, is perfectly horizontal and rests on the upper end of the spindle B, shown in blue lines. The upper part of this spindle is smaller in diameter than the recess $a$, and the upper end of the spindle is somewhat convex. The spindle is also provided with the usual driver C.

From the above description it will be seen that a certain degree of lateral movement will be allowed the runner or rotating mill stone and consequently when said stone is put in motion it will adjust and balance itself on the spindle as the rotation of the stone will cause it to find its proper center on the spindle.

The ordinary plan is to have a conical recess in the under side of the balance iron and have the upper end of the spindle terminate in a point which fits in the recess in the balance iron. This plan, it will be seen, admits of no adjustment of the runner and the latter if not at first adjusted perfectly true, cannot perform good work.

Having thus described my invention, what I claim as new, and desire to secure by Letters Patent, is—

Providing the balance iron A, with a recess $a$, larger in diameter than the upper part of the spindle and having a plate $b$, which rests on the spindle fitted in the recess, as and for the purpose herein set forth.

Z. McDANIEL.

Witnesses:
W. K. Smith,
John Burnam.